US012662210B2

(12) United States Patent
Broadbent et al.

(10) Patent No.: US 12,662,210 B2
(45) Date of Patent: Jun. 23, 2026

(54) CARGO PACK FOR ATTACHMENT TO A BICYCLE

(71) Applicant: Tailfin Limited, Bristol (GB)

(72) Inventors: Nicholas Broadbent, Bristol (GB); Robert Phillips, Bristol (GB); Olivia Cowley, Axbridge (GB); Martyn Long, Bristol (GB)

(73) Assignee: TAILFIN LIMITED, Bristol (GB)

( * ) Notice: Subject to any disclaimer, the term of this patent is extended or adjusted under 35 U.S.C. 154(b) by 23 days.

(21) Appl. No.: 18/912,789

(22) Filed: Oct. 11, 2024

(65) Prior Publication Data

US 2025/0121899 A1 Apr. 17, 2025

(30) Foreign Application Priority Data

Oct. 12, 2023 (GB) ...................................... 2315649

(51) Int. Cl.
B62J 9/22 (2020.01)
B62J 9/27 (2020.01)

(52) U.S. Cl.
CPC .. B62J 9/22 (2020.02); B62J 9/27 (2020.02)

(58) Field of Classification Search
CPC ......... B62J 9/22; B62J 9/27; B62J 9/21; B62J 9/26; B62J 9/23; B62J 9/00; B62J 7/02; B62J 7/04; B62J 7/06; B62J 7/00
USPC ................................................ 224/425–426
See application file for complete search history.

(56) References Cited

U.S. PATENT DOCUMENTS

| | | | | | |
|---|---|---|---|---|---|
| 4,869,408 | A | * | 9/1989 | Lutz ........................... | B62J 9/27 |
| | | | | | 224/438 |
| 5,031,807 | A | * | 7/1991 | Tiffany ...................... | B62J 9/22 |
| | | | | | 224/438 |
| 5,127,563 | A | * | 7/1992 | Chan .......................... | B62J 9/26 |
| | | | | | 224/438 |
| RE34,474 | E | * | 12/1993 | Lutz ........................... | B62J 9/27 |
| | | | | | 224/438 |

(Continued)

FOREIGN PATENT DOCUMENTS

| | | |
|---|---|---|
| GB | 2617256 A | 10/2023 |
| GB | 2617879 A | 10/2023 |

OTHER PUBLICATIONS

UK Search Report dated Mar. 25, 2024 in co-pending UK Application No. GB 2315649.0.

*Primary Examiner* — Adam J Waggenspack
(74) *Attorney, Agent, or Firm* — Perilla Knox & Hildebrandt LLP

(57) ABSTRACT

A cargo pack for attachment to a bicycle comprises an outer casing of a flexible material provided with an opening for loading the pack. The outer casing has oppositely disposed side walls and an attachment wall extending between the side walls and intended to lie adjacent a frame member of the bicycle. The attachment wall is provided with at least one mounting block having a surface for contact with the frame member and a securing flange situated within the outer casing and secured to the material of the outer casing. The outer casing is provided with a stiffening structure for enhancing the rigidity of the attachment wall, the stiffening structure comprising a pair of rods which extend along the attachment wall adjacent the respective side walls, the rods engaging the securing flanges to retain the rods with respect to the mounting blocks.

25 Claims, 6 Drawing Sheets

(56)            References Cited

U.S. PATENT DOCUMENTS

| 12,459,591 | B2 * | 11/2025 | Broadbent | ................. | B62J 9/27 |
| 2023/0264773 | A1 * | 8/2023 | Broadbent | ................. | B62J 9/22 |
| | | | | | 224/425 |

* cited by examiner

CARGO PACK FOR ATTACHMENT TO A BICYCLE

FIELD OF INVENTION

This invention relates to a cargo pack for attachment to a bicycle.

BACKGROUND

Bikepacking is a popular leisure pursuit which often involves multi-day touring on a bicycle, often an off-road bicycle such as a mountain bike. Everything needed for touring is carried on the bicycle or by the rider. There is therefore a need for luggage containers, often referred to as cargo packs, which can be attached to the bicycle and can be loaded with equipment such as clothing, sleeping bags and food.

"Soft" packs, such as collapsible bags, are known for this purpose, but pose particular problems. There is a temptation to overstuff such bags, which leads to them bulging beyond their normal dimensions which can cause them to come into contact with moving parts of the bicycle or of the rider. In particular, soft packs attached to frame tubes of the bicycle can project into the path of the rider's legs, and this can be a source of irritation and can even lead to abrasion of the rider's clothing or skin. Additionally, if packs are attached at distinct mounting points along a horizontal frame tube such as a top tube, they have a tendency to sag between attachment points. This is unsightly but also accentuates the bulging that can occur.

SUMMARY

According to the present invention there is provided a cargo pack for attachment to a bicycle, the pack comprising an outer casing of a flexible material provided with an opening for loading the pack, the outer casing having oppositely disposed side walls and an attachment wall extending between the side walls and intended to lie adjacent a frame member of the bicycle, the attachment wall being provided with at least one mounting block having a surface for contact with the frame member and a securing flange secured to the material of the outer casing, the outer casing being provided with a stiffening structure for enhancing the rigidity of the attachment wall, the stiffening structure comprising a pair of rods which extend along the attachment wall adjacent the respective side walls, the rods engaging the securing flange to retain the rods with respect to the mounting block.

The pack may be elongate and the rods may extend in the lengthwise direction of the pack. The pack may be tapered in the lengthwise direction, the rods being inclined to each other so as to converge in the direction of taper. The outer casing may have oppositely disposed end walls closing opposite ends of the pack.

At least one of the end walls may be provided with an aperture for the passage of a flexible supply element. The aperture may be provided with a closure.

The securing flange of the mounting block may be welded to the material of the attachment wall.

The mounting block may have an arcuate channel through which a strap can be passed for securing the mounting block, and hence the pack, to the bicycle frame member. The profile of the arcuate channel may result in a convex surface which projects into the interior of the pack.

The attachment wall may be provided with at least two of the mounting blocks provided with respective securing flanges, the rods extending between the mounting blocks and engaging the securing flanges.

The securing flange or at least one of the securing flanges may extend within the pack and may be provided with channels which receive the respective rods, thereby to secure the rods to the securing flange.

Each channel of the securing flange, or of at least one of the securing flanges, may have a respective slot along its length whereby the rod is insertable into the channel through the slot. The width of the slot may be less than the transverse dimension of the rod whereby the rod is insertable into the channel with a snap action.

The channels of the securing flange, or of at least one of the securing flanges may be tubular whereby the rod is insertable into the channel by lengthwise sliding.

Where there are at least two of the mounting blocks, a guide element may be secured to the attachment wall between the mounting blocks.

The guide element may comprise a flexible material having passages through which the rods extend. The flexible material may be welded to the material of the attachment wall.

The opening may be an elongate opening provided in one of the side walls. The opening may extend in the lengthwise direction of the pack.

An elongate reinforcing element may be provided on the respective side wall adjacent the opening. The elongate reinforcing element may be situated in an elongate pocket provided on the internal side of the respective side wall. A closure means may be provided for closing the opening. The elongate reinforcing element may be in the form of a batten which may be profiled to have a smooth contour on its inwardly facing surface. The cross-sectional shape of the batten may taper in the direction towards the opening.

Another aspect in accordance with the present invention provides a method of assembling a cargo pack as defined above and provided with an aperture for the passage of a flexible supply element, the method comprising inserting the rods through the aperture into engagement with the securing flange.

Where the securing flange, or at least one of the securing flanges, is provided with channels, the rods may be inserted through the aperture into the respective channels.

Where the channel of the securing flange, or of at least one of the securing flanges, has a respective slot along its length, the rods may be positioned adjacent the respective channels and displaced into the respective channel through the slot.

Where the channels of the securing flange, or of at least one of the securing flanges are tubular, the rods may be inserted into one end of the respective channels and displaced into the respective channels by linear sliding.

Where a guide element is provided which comprises a flexible material having passages, the rods are passed through the passages provided in the guide element.

In a broader aspect of the invention, there is provided a cargo pack for attachment to a bicycle, the pack comprising an outer casing of a flexible material provided with an opening for loading the pack, the outer casing having oppositely disposed side walls and an attachment wall extending between the side walls and intended to lie adjacent a frame member of the bicycle, the attachment wall being provided with at least one mounting block having a surface for contact with the frame member and a securing flange secured to the material of the outer casing, the outer casing being provided with a stiffening structure for enhancing the rigidity of the attachment wall, the stiffening structure comprising a pair of rods which extend along the attachment wall adjacent the respective side walls, each rod extending within a channel provided in the outer casing to retain the rod with respect to the outer casing.

For a better understanding of the present invention, and to show more clearly how it may be carried into effect, reference will now be made, by way of example, to the accompanying drawings, in which:

DETAILED DESCRIPTION

Figures 1, 2:
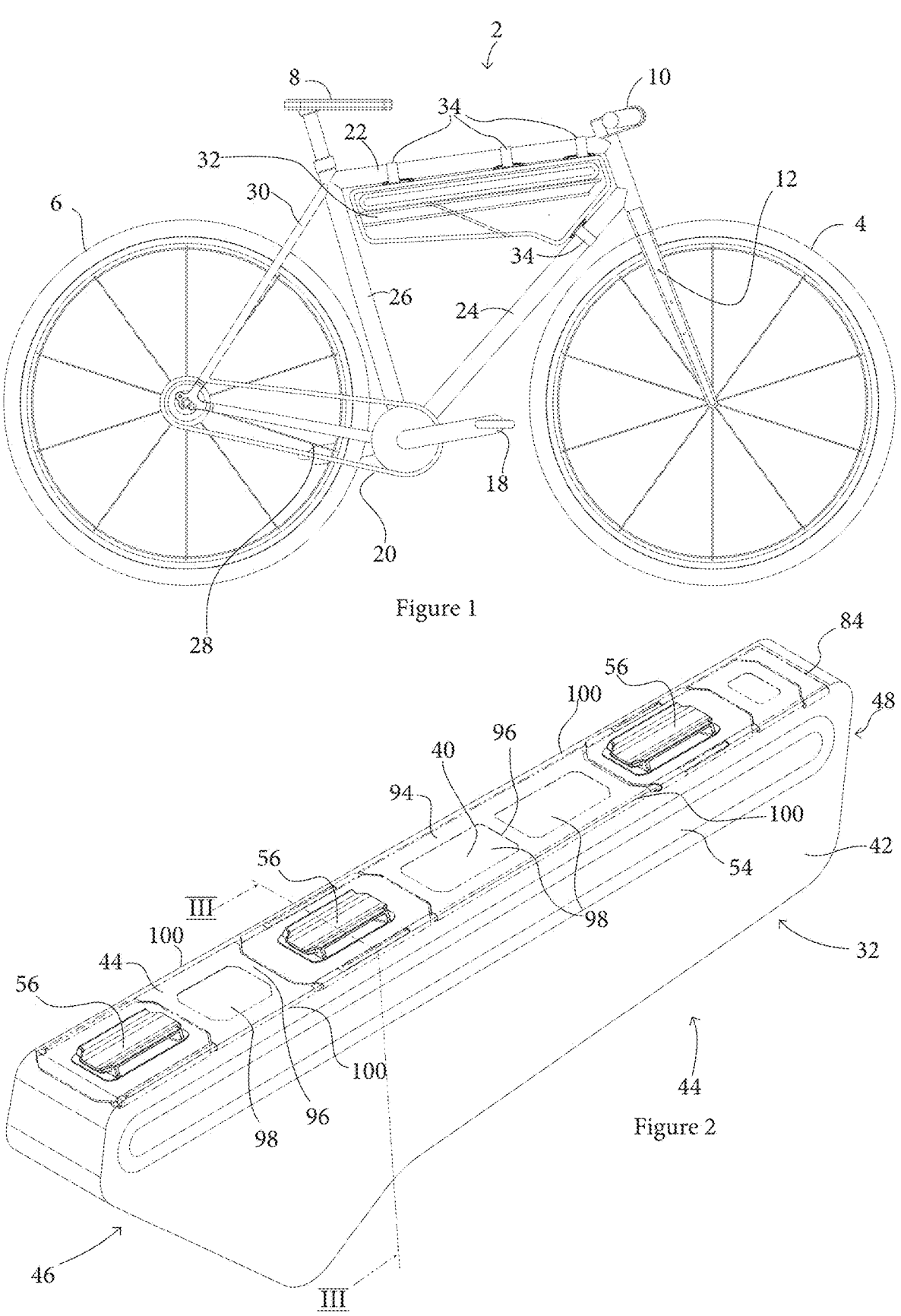
FIG. 1 shows a bicycle provided with a cargo pack fitted to the top tube of the frame of the bicycle.
FIG. 2 is a perspective view of the cargo pack.

Although the bicycle shown in FIG. 1 is of generic form, the present invention may be applied to cargo packs for use with mountain bikes suitable for bikepacking.

Although not shown, the bicycle may be provided with one or more luggage racks, panniers and other accessories for carrying the equipment needed for multi-day touring.

The bike of FIG. 1, as is conventional, comprises a frame 2 carrying front and rear wheels 4, 6, a saddle 8 and handlebars 10 for steering the front wheel 4 which is supported by a front fork 12. Pedals 18 drive the rear wheel 6 through a chain 20. In this specification, the expressions "frame" and "frame member" are used in a broad sense to embrace not only the main "diamond" frame which includes a top tube 22, a down tube 24 and a seat post 26, but also other structural members of the bike including, for example, the front fork 12, chain and seat stays 28, 30, and the handlebars 10.

Some frame members of the frame 2 are provided with brazed-in tapped inserts (not shown) to which accessories such as cargo packs can be fixed. The tapped inserts can also be used to secure other accessories such as a water bottle or a pump.

It is sometimes desirable to carry additional cargo packs on the frame at locations where there are no tapped inserts, or where existing tapped inserts are not suitable. For example, as shown in FIG. 1, a cargo pack 32 is carried by the top tube 22, to which it is secured by straps 34.

Figures 11, 12, 13, 14:
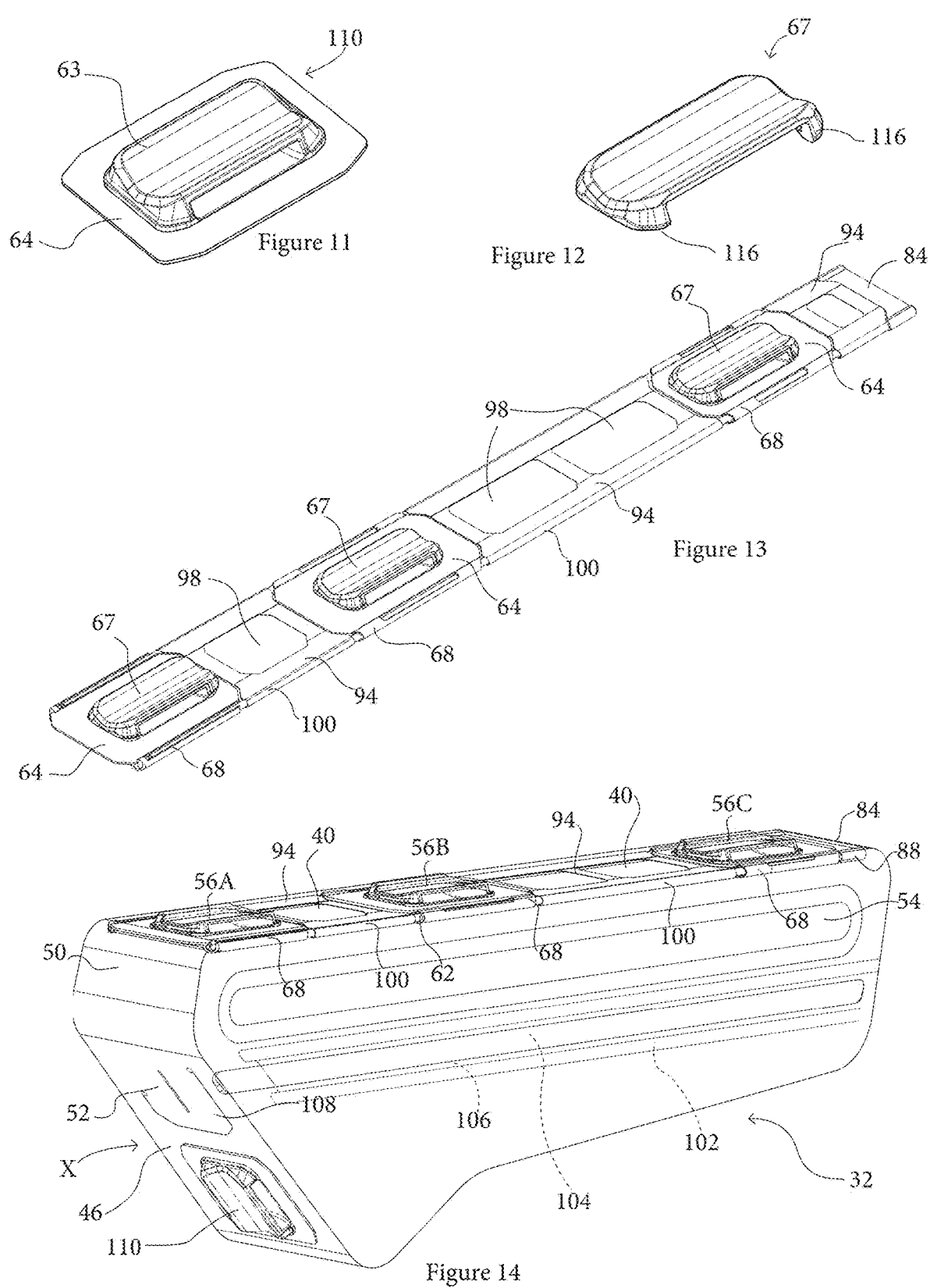
FIG. 11 shows a front mounting block 40 cargo pack.
FIG. 12 shows a soft cover for the mounting blocks of FIGS. 6, 7 and 9.
FIG. 13 corresponds to FIG. 4 but illustrates soft covers as shown in FIG. 12.
FIG. 14 corresponds to FIG. 2 but shows an alternative view.

FIGS. 2 and 14 show the cargo pack 32 in greater detail. The cargo pack 32 is in the form of a bag made from a waterproof textile or sheet material, such as a 420D nylon or other plastics material, which is sufficiently stiff to maintain its shape when unstressed, but which will flex if, for example, baggage items are pressed forcefully into the bag, or if straps or the like are tensioned around the periphery of the bag. As can be appreciated from FIG. 2, the bag 32 has an elongate form, with a generally rectangular or trapezium-shaped cross-section, although it could have other cross-sectional shapes, for example generally circular. When fitted to the bike as shown in FIG. 1, the lengthwise direction of the pack 32 extends in the travel direction of the bike. The pack 32 tapers slightly from bottom to top (i.e. in the direction towards the top tube 22) and also tapers slightly from front to rear.

The bag 32 has four sides comprising an attachment wall 40, two side walls 42 (only one visible in FIG. 2), and an outer wall 44 situated opposite the attachment wall 40. The opposite ends of the bag 32 are closed by front and rear end walls 46, 48. The front end wall 46 comprises two sections 50, 52 which are inclined to each other.

Figure 3:
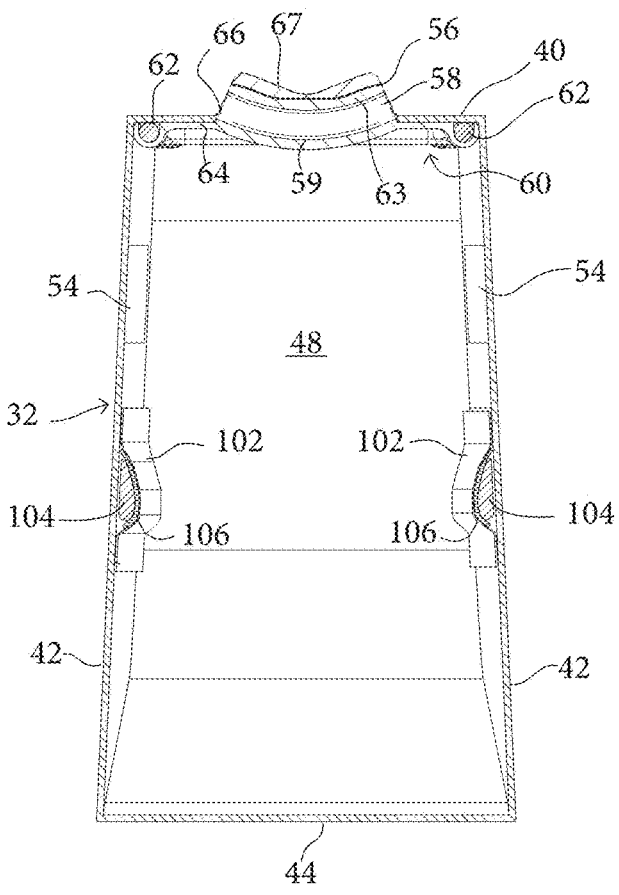
FIG. 3 is a sectional view taken generally on the line III-III FIG. 2.

As shown in FIGS. 2 and 3, the side walls 42 have openings 54 extending along the major part of the respective side walls 42. The openings 54 are closable by means of a zipper or other suitable fastener.

As shown in FIG. 14, the end wall 46 is provided with an aperture 108 which extends through the flexible material of the bag 32. At the outer surface of the bag 32, the aperture 108 is provided with a closure, such as a fabric flap, so that the aperture 108 is closed when not in use, or at least partially closed around components such as an electrical lead or a drinking tube leading from an electrical device or liquid container within the bag 32. Securing means of a suitable form, for example of Velcro®, may be provided to keep the closure closed.

The front wall 46 is also provided with a front mount 110 for engagement with the down tube 24.

The bag is provided with mounting blocks 56 for use in securing the cargo pack 32 to a frame member, such as the top tube 22, of the bike. The mounting blocks 56 are generally of the form of those disclosed in GB2617256, to which reference is directed. One or more of the mounting blocks 56 can be fitted with a strap 34, as appropriate, to secure the cargo pack. Referring to FIG. 3, the mounting blocks 56 each have an arcuate channel 58 through which the strap 34 can be passed. The profile of the channel 58 results in a convex surface 59 which projects into the interior of the pack 32. The mounting blocks 56 and the front mount 110 may be made, for example by injection moulding, from any suitable material, for example a plastics material. A suitable material is thermoplastic polyurethane (TPU). The front mount 110 is secured, for example by RF welding, to the outside surface of the front panel 46. The front mount 110 may be made from a softer composition of TPU than the mounting blocks 56, so that the front mount 110 can engage the down tube 24 to stabilise the cargo pack 32 without damage to the down tube 24.

FIG. 3 shows a stiffening structure 60 which is fitted within the bag to provide additional rigidity to maintain the overall shape of the bag 32. The stiffening structure 60 principally comprises a pair of rods 62 which extend in the lengthwise direction of the pack 32 over almost the full extent of the pack 32. As can be seen from FIG. 3, the rods 62 lie adjacent the top wall 40 of the pack 32, and close to the side walls 42

Each mounting block 56 comprises a mount 63 and a securing flange 64. The securing flange 64 is disposed against the inner surface of the attachment wall 40 and secured to the attachment wall 40, for example by RF welding. The securing flange 64 may be formed integrally with the mount 63, or alternatively may be formed separately and bonded or otherwise secured to the mount 63. The mount 63 projects from the securing flange 64 through an opening 66 formed in the attachment wall 40 so that its top surface, which is provided with a pad 67 of resilient material, is presented for positioning against the top tube 22.

Figure 4:
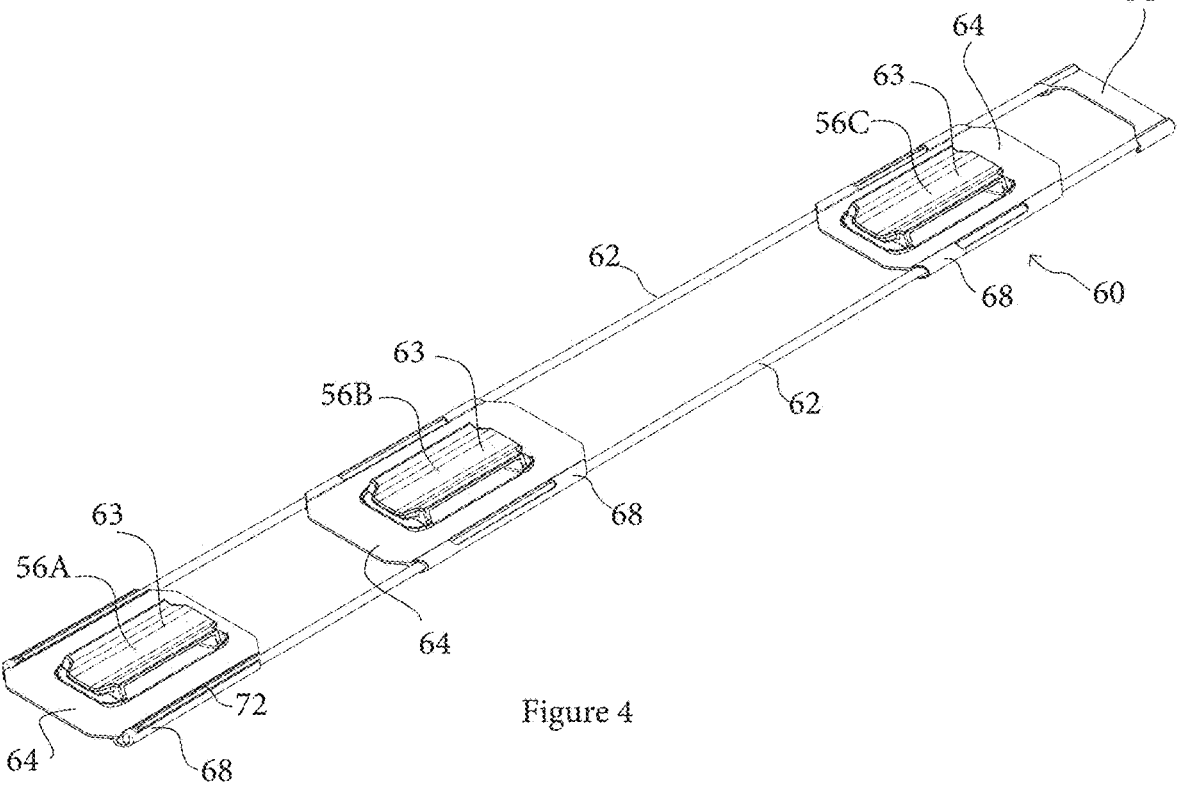
FIG. 4 is a perspective view of a stiffening structure of the cargo pack of FIG. 2.
Figures 5, 6, 7, 8, 9, 10:
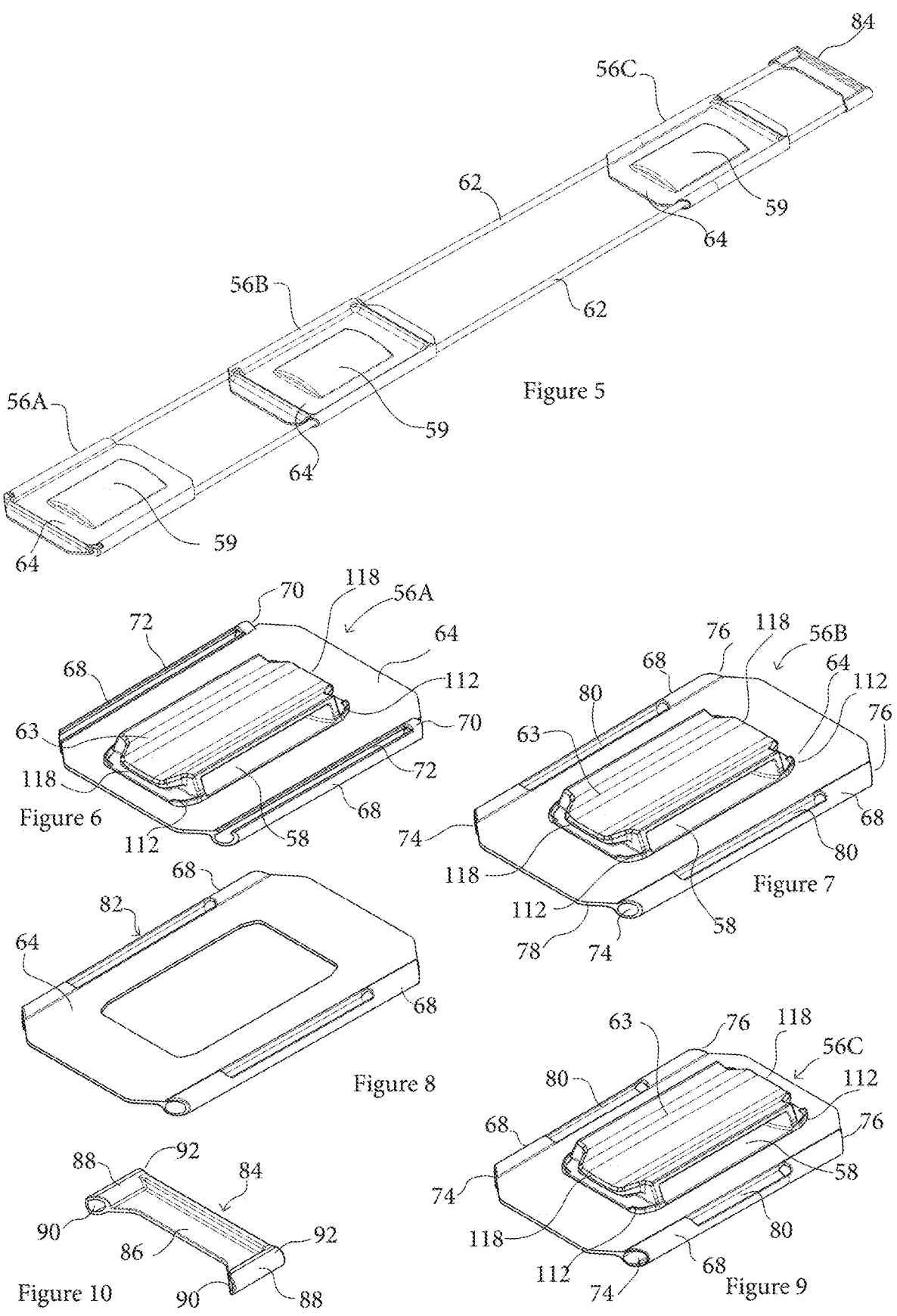
FIG. 5 is an underneath view of the stiffening structure of FIG. 4.
FIGS. 6 to 10 show components of the stiffening structure of FIGS. 4 and 5.

In the embodiment shown in the drawings, there are three mounting blocks 56, although two, or more than three, mounting blocks may be provided. FIGS. 4 and 5 show the stiffening structure 60 separated from the pack 32, and FIGS. 6, 7 and 9 show the individual mounting blocks 56 present in the structure 60 shown in FIGS. 4 and 5. Although the mounting blocks 56 are broadly similar in construction to each other, there are differences as explained below, and consequently the mounting blocks 56 have been designated separately as a front mounting block 56A, an intermediate mounting block 56B and a rear mounting block 56C.

Referring to FIG. 6, the securing flange 64 of the front mounting block 56A is of generally rectangular form having, at its lateral edges, channels 68 which are closed at their forward ends 70. As shown in FIG. 5, the channels 68 receive the rods 62, which are prevented from sliding forward beyond the closed ends 70. The channels 68 are open along their length by way of slots 72 which are slightly narrower than the interior of the channels 68 and of the rods 62. As a result of this measure, the rods 62 can be engaged with the channels 68 by pressing them laterally through the slots 72. The securing flange 64, and consequently the integrally formed channels 68, are made from a suitably resilient material to enable this to happen.

At the corners of the mount 63 there are ribs 112 which project upwardly from the securing flange 64. These ribs served to align the mounting blocks 56 within the openings 66 in the attachment wall 40 of the pack 32.

FIGS. 7 and 8 show the intermediate and rear mounting blocks 56B and 56C. These mounting blocks are generally similar to the front mounting block 56A, but have channels 68 which lack the full-length slot 72 of the mounting block 56A. Instead, the wall of the channel 68 is fully closed, at least at its front and rear ends, so that the rods 62 cannot be introduced into the channels 68 laterally. In other words, each of the channels 68 can be regarded as tubular, in the sense that, at least at their front and rear ends, the channel wall is continuous. Also, both ends of the channels 68 are open, so the rods 62 can be introduced at one end (end 76 being the forward-facing end in the embodiment shown) and can slide in the lengthwise direction completely through the channels 68. It will be noted that the corners of the securing flanges 64 are cut obliquely, for example at 78. This gives the openings at the ends 74, 76 of the channel 68 an oval profile, which assists introducing the ends of the rods 62 into the channel 68. It will be appreciated that the channels 68 of the mounting block 56B (and also of the mounting block 56C) are provided with longitudinal slots 80, but these do not extend to the ends of the channel 68 and are provided primarily for weight- and material-saving purposes.

The mounting blocks 56B and 56C are generally similar to each other, although differ in some details and in dimensions, because the pack 32 tapers slightly from front to rear, which means that the rear mounting block 56C is slightly narrower than the intermediate mounting block 56B.

The weldable mounting blocks 56 are preferably made from a very hard grade of TPU which can be welded to the material of the attachment wall 40. The harder the grade the stiffer the pack is to stop it ballooning. The stiffening structure 60 thus comprises stiff blocks 56 connecting to the stiff carbon rods 62 creating a rigid structure 60. The resilient pad 67 conforms well to the frame so it remains in place without the danger of scratching the frame tube.

If the block and pad 56, 67 were formed as an integral component it either wouldn't be stiff enough to create a sufficiently rigid structure 60 or it would be too stiff to attach nicely without scratching the frame tube.

FIG. 8 shows a spacer piece 82 which is not employed in the stiffening structure of FIGS. 4 and 5 but can be used, with other mounting blocks 56 and the rods 62 in order to provide rigidity to the structure without unnecessary weight increase, should this be necessary. The spacer piece 82 has a securing flange 64 and channels 68 as described above, but lacks the added bulk of the mounting blocks 56

FIG. 10 shows an end piece 84 which is provided with a relatively small securing flange 86 and relatively short channels 88 which are open at their forward ends 90 but closed at their rear ends 92. As shown in FIGS. 4 and 5, the end piece 84 receives the rearward ends of the rods 62.

FIG. 11 shows the front mount 110 which, like the mounting blocks 56, comprises a mount 63 and a securing flange 64. The front mount 110 also has a slot 58 for receiving a strap.

FIG. 12 shows one of the pads 67 for fitting to the mount 63 of each mounting block 56. The pad 67 has a top section 114 for engagement with the top tube 22 of the bicycle. At each end, the pad 67 has downward extensions 116 which are engageable with lugs 118 (see FIGS. 6, 7 and 9) provided on the mount 63. The pads 67 are made from a suitable elastomeric material.

For use, the mounting blocks 56 and the end piece 84 are fixed to the inner surface of the attachment wall 40 of the cargo pack 32, for example by radio-frequency (RF) welding of the securing flanges 64 to the material of the attachment wall 40. In addition, guide elements 94 (see FIGS. 2 and 14) are secured to the inner surface of the attachment wall 40. These guide elements are made of a flexible material which may be an elastomer or may be a nylon fabric coated with a thermoplastic polyurethane (TPU) to enable the fabric to be welded to itself or other components.

The guide elements 94 have a central securing region 96, optionally provided with apertures 98, and lateral passages 100, similar in form to the channels 68 of the securing flanges 64, for receiving the rods 62. The central regions 96 are secured to the inner surface of the attachment wall 40, for example by bonding or RF welding.

As shown in FIGS. 3 and 14, the cargo pack 32 is provided with longitudinal sleeves or pockets 102 formed by strips of a flexible material which are bonded or welded to the side walls 42. These pockets 102 receive stiffening battens 104 which extend over substantially the full length of the pack 32. The stiffening battens 104 are situated beneath, but relatively close to, the openings 54 and served to resist outward bending of the side walls 42 under pressure from the contents of the cargo pack 32. The battens 104 are profiled to have a smooth contour on their inwardly facing surfaces, which surfaces taper in the direction towards the openings 54. The purpose of this is to eliminate sharp corners on the battens 104 which can catch on hands or fingers entering the pack 32 to introduce or withdraw items. For a similar comfort purpose, a layer of soft material 106, such as a closed cell foam, is provided on the inside surface of each batten 104.

The battens 104 are made from any suitable stiff and lightweight material, for example metal alloy, or a plastics material (such as a fibre reinforced plastics material). In a preferred embodiment, the battens 104 are made from a carbon reinforced plastics material. The battens 104 are dimensioned to provide the side walls 42 with sufficient stiffness to reduce bulging of the material of the bag 32 outwardly when the bag 32 is packed with cargo. This avoids contact of the side walls 42 with the rider's legs. The battens 104 have the additional effect of providing greater rigidity to the bag 32 so as to avoid overstressing of the zipper or other closure mechanism which closes the opening 54, when the bag 32 is packed with cargo.

The battens 104 may be fitted within the pockets 102 in a variety of ways, but one particularly advantageous arrangement is for the pockets 102 to be open at the ends nearer the end wall 46. This measure enables the battens 104 to be inserted through the aperture 108 and then passed into the open ends of the pockets 102 until they are fully positioned within the pockets 106.

The stiffening structure 60 is assembled within the bag as follows. The mounting blocks 56 are fixed at the openings 66 in the attachment wall 40. The securing flanges 64 are fixed to the inside surface of the attachment wall 40 so that the mounts 63 project through the openings. The ribs 112 engage the corners of the openings 66 to align the mounting blocks 56 with the openings 66 during the attachment process. The guide elements 94 are similarly secured to the inside surface of the attachment wall 40.

Figure 15:
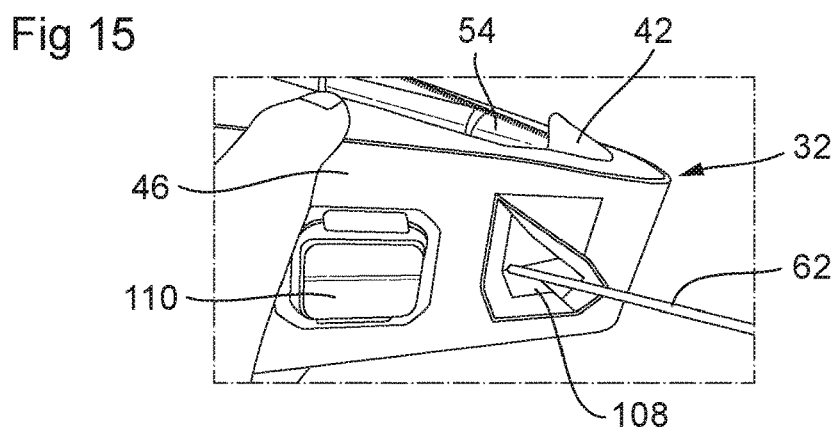
FIG. 15 shows a rod being passed through an aperture extending through flexible material of the cargo pack.
Figure 16:
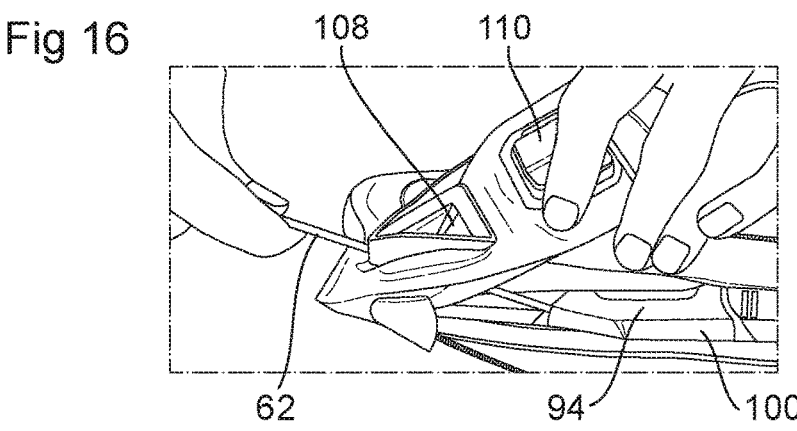
FIG. 16 shows the rod being passed into a lateral passage of a guide element situated closest to a front wall of the cargo pack.
Figure 17:
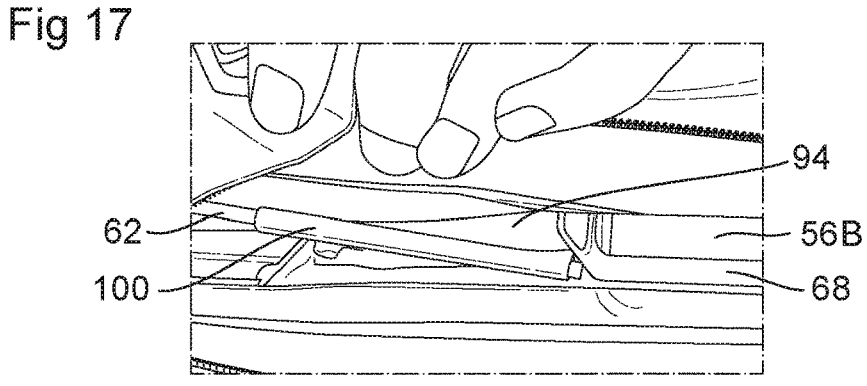
FIG. 17 shows the rod being guided by the guide element towards a channel of an intermediate mounting block.
Figure 18:
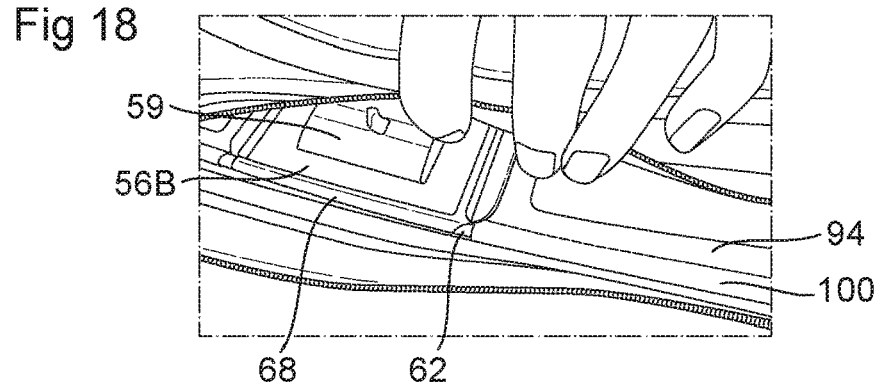
FIG. 18 shows the rod after passing through the channel of the intermediate mounting block and into a passage of a further guide element.
Figure 19:
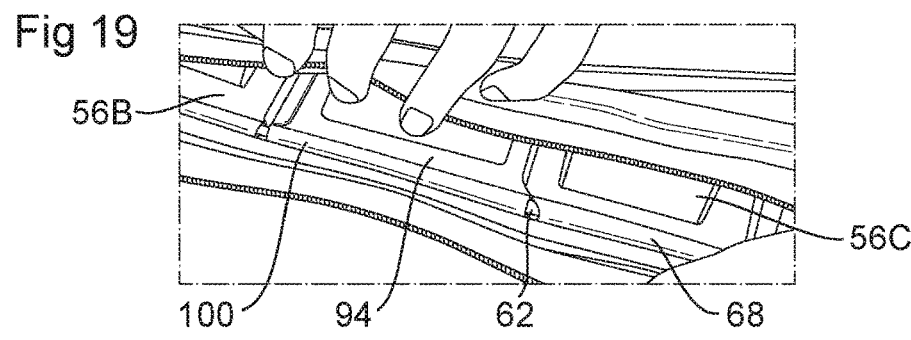
FIG. 19 shows the rod being guided into a channel of a rear mounting block.

Referring to FIGS. 15 to 22, the aperture 108 is opened and the material of the bag is collapsed to enable one of the rods 62 to be passed through the aperture 108 into the lateral passage 100 of the guide element 94 situated closest to the front wall 46. This is shown in FIG. 15. As shown in FIGS. 16 and 17, the rod 62 is pushed through the passage 100, which serves as a guide directing the rod 62, as it emerges from the passage 100, into the channel 68 of the mounting block 56B, i.e. the second mounting block from the front wall 46. The rod 62 can then pass through the channel 68 into the passage 100 of the next guide element 94 (FIG. 18) and thence, in a similar way, into the channel 68 of the rear mounting block 56C, i.e. the mounting block furthest from the front wall 46 (FIG. 19). On emerging from the channel 68 of the guide block 56C, the tip of the rod 62 enters the short channel 88 of the end piece 84. At this point (FIGS. 21 and 22), the rod 62 is situated entirely within the pack 32 and the portion of the rod 62 projecting forwardly from the passage 100 of the guide element 94 nearest the front wall 46 can be pressed laterally with a snap action through the slot 72 into the channel 68 of the front mounting block 56A. In this condition, the rod 60 is prevented from lengthwise movement by the closed end 92 of the end piece 84 and the closed end 70 of the front mounting block 56A.

Figure 20:
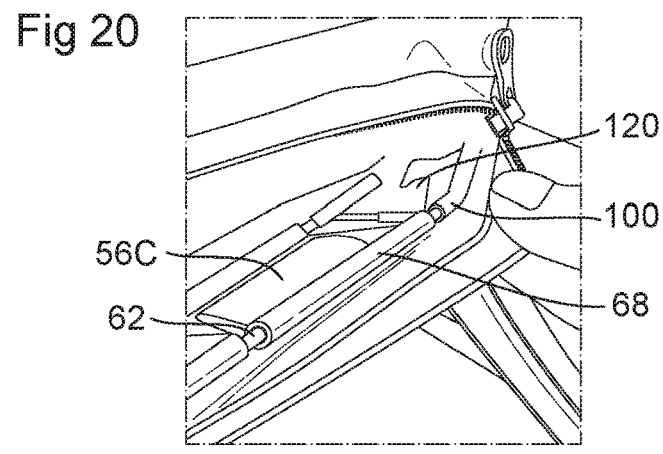
FIG. 20 shows the rod passing through a passage of an optional additional guide element after leaving the rear mounting block.
Figure 21:
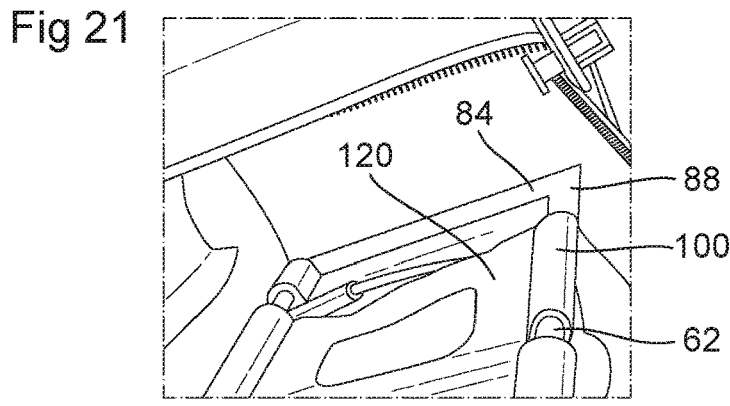
FIG. 21 shows the rod passing from the optional additional guide element towards a channel of an end piece.
Figure 22:
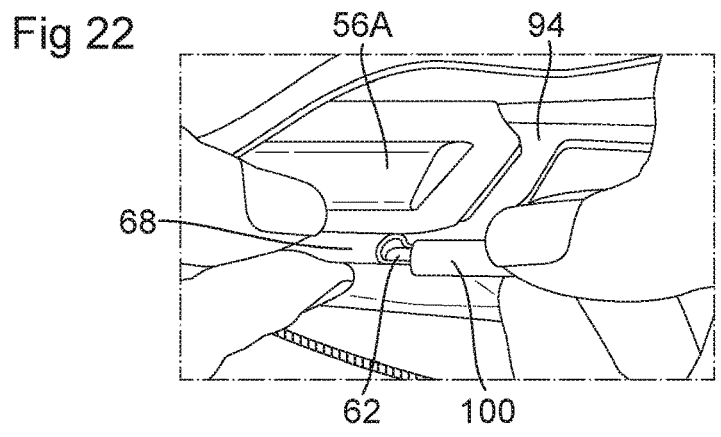
FIG. 22 shows a forward portion of the rod being pressed into a channel of a front mounting block.

FIGS. 20 and 21 show an optional additional guide element 120 situated between the rear mounting block 56C and the end piece 84. It will be appreciated that the rod 62 passes through the passage 100 of the additional guide element 120 on its way to the channel 88 of the end piece 84. The additional guide element 120 is omitted in the embodiment shown in FIG. 14 in order to adapt the spacing of the mounting blocks 56 to the overall length of the pack 32. By including or excluding the guide elements 94, 120, and by utilising guide elements 94, 120 of different lengths, it is possible to achieve a desired spacing of the mounting blocks 56 to suit different lengths of packs 32.

A similar procedure is adopted for the rod 62 on the opposite side of the pack 32 to form the completed stiffening structure 60.

Although the process illustrated in FIGS. 15 to 22 is shown as being performed by hand, it will be appreciated that some or all of the process may be mechanised.

It will be appreciated that the number and spacing of mounting blocks 56 can be adjusted to suit the dimensions of any particular configuration of the pack 32. For example, a shorter pack may require only two mounting blocks 56, with a single guide element 94 situated between them. For a longer pack 32, three mounting blocks 56 may be sufficient, but the spacer piece 82 may be employed between two of the mounting blocks 56 in order to enhance the rigidity of the attachment wall 14. Guide elements 94 may be provided on each side of the spacer piece 82. Consequently, the modular construction of the stiffening structure 60 enables common parts, such as the mounting blocks 56, the guide elements 94 and the end piece 84 to be combined in various configurations to provide stiffening structures 60 suitable for a variety of sizes and shapes of cargo packs 32. The carbon rods 62 can be cut to length to suit the cargo pack in question.

For the avoidance of doubt, the present application extends to the subject-matter described in the following numbered Statements:

Statement 1. A cargo pack for attachment to a bicycle, the pack comprising an outer casing of a flexible material provided with an opening for loading the pack, the outer casing having oppositely disposed side walls and an attachment wall extending between the side walls and intended to lie adjacent a frame member of the bicycle, the attachment wall being provided with at least one mounting block having a surface for contact with the frame member and a securing flange secured to the material of the outer casing, the outer casing being provided with a stiffening structure for enhancing the rigidity of the attachment wall, the stiffening structure comprising a pair of rods which extend along the attachment wall adjacent the respective side walls, the rods engaging the securing flange to retain the rods with respect to the mounting block.

Statement 2. A cargo pack as in Statement 1, in which the pack is elongate and the rods extend in the lengthwise direction of the pack.

Statement 3. A cargo pack as in Statement 2, in which the pack is tapered in the lengthwise direction, the rods being inclined to each other so as to converge in the direction of taper.

Statement 4. A cargo pack as in any one of Statements 1 to 3, in which the outer casing has oppositely disposed end walls closing opposite ends of the pack.

Statement 5. A cargo pack as in Statement 4, in which at least one of the end walls is provided with an aperture for the passage of a flexible supply element.

Statement 6. A cargo pack as in Statement 5, in which the aperture is provided with a closure.

Statement 7. A cargo pack as in any one of the preceding Statements, in which the securing flange of the mounting block is welded to the material of the attachment wall.

Statement 8. A cargo pack as in any one of the preceding Statements, in which the attachment wall is provided with at least two of the mounting blocks provided with respective securing flanges, the rods extending between the mounting blocks and engaging the securing flanges.

Statement 9. A cargo pack as in any one of the preceding Statements, in which the securing flange or at least one of the securing flanges extends within the pack is provided with channels which receive the respective rods, thereby to secure the rods to the securing flange.

Statement 10. A cargo pack as in Statement 9, in which each channel of the securing flange, or of at least one of the securing flanges, has a respective slot along its length whereby the rod is insertable into the channel through the slot.

Statement 11. A cargo pack as in Statement 10, in which the width of the slot is less than the transverse dimension of the rod whereby the rod is insertable into the channel with a snap action.

Statement 12. A cargo pack as in any one of Statements 9 to 11, in which the channels of the securing flange, or of at least one of the securing flanges is tubular whereby the rod is insertable into the channel by lengthwise sliding.

Statement 13. A cargo pack as in Statement 8 or in any one of Statements 9 to 12 when appendant to Statement 8, in which a guide element is secured to the attachment wall between the mounting blocks.

Statement 14. A cargo pack as in Statement 13, in which the guide element comprises a flexible material having passages through which the rods extend.

Statement 15. A cargo pack as in Statement 14, in which the flexible material is welded to the material of the attachment wall.

Statement 16. A cargo pack as in any one of the preceding Statements, in which the opening is an elongate opening provided in one of the side walls.

Statement 17. A cargo pack as in Statement 16 when appendant to Statement 2, in which the opening extends in the lengthwise direction of the pack.

Statement 18. A cargo pack as in Statement 16 or 17, in which an elongate reinforcing element is provided on the respective side wall adjacent the opening.

Statement 19. A cargo pack as in Statement 18, in which the elongate reinforcing element is situated in an elongate pocket provided on the internal side of the respective side wall.

Statement 20. A cargo pack as in any one of the preceding Statements, in which a closure means is provided for closing the opening.

Statement 21. A method of assembling a cargo pack as in Statement 5 or any one of Statements is 6 to 20 when appendant to Statement 5, the method comprising inserting the rods through the aperture into engagement with the securing flange.

Statement 22. A method as in Statement 21 of assembling a cargo pack in accordance with Statement 9, in which the rods are inserted through the aperture into the respective channels.

Statement 23. A method as in Statement 22 of assembling a cargo pack in accordance with Statement 10, in which the rods are positioned adjacent the respective channels and are displaced into the respective channel through the slot.

Statement 24. A method as in Statement 22 of assembling a cargo pack in accordance with Statement 12, in which the rods are inserted into one end of the respective channels and displaced into the respective channels by linear sliding.

Statement 25. A method as in Statement 22 of assembling a cargo pack in accordance with Statement 14, in which the rods are passed through the passages provided in the guide element.

The invention claimed is:

1. A cargo pack for attachment to a bicycle, the pack comprising an outer casing of a flexible material provided with an opening for loading the pack, the outer casing having oppositely disposed side walls and an attachment wall extending between the side walls and intended to lie adjacent a frame member of the bicycle, the attachment wall being provided with at least one mounting block having a surface for contact with the frame member and a securing flange secured to the material of the outer casing, the outer casing being provided with a stiffening structure for enhancing the rigidity of the attachment wall, the stiffening structure comprising a pair of rods which extend along the attachment wall adjacent the respective side walls, the rods engaging the securing flange to retain the rods with respect to the mounting block.

2. A cargo pack as claimed in claim 1, wherein the pack is elongate and the rods extend in the lengthwise direction of the pack.

3. A cargo pack as claimed in claim 2, wherein the pack is tapered in the lengthwise direction, the rods being inclined to each other so as to converge in the direction of taper.

4. A cargo pack as claimed in claim 1, wherein the outer casing has oppositely disposed end walls closing opposite ends of the pack.

5. A cargo pack as claimed in claim 4, wherein at least one of the end walls is provided with an aperture for the passage of a flexible supply element.

6. A cargo pack as claimed in claim 5, wherein the aperture is provided with a closure.

7. A cargo pack as claimed in claim 1, wherein the securing flange of the mounting block is welded to the material of the attachment wall.

8. A cargo pack as claimed in claim 1, wherein the attachment wall is provided with at least two of the mounting blocks provided with respective securing flanges, the rods extending between the mounting blocks and engaging the securing flanges.

9. A cargo pack as claimed in claim 1, wherein the securing flange or at least one of the securing flanges extends within the pack and is provided with channels which receive the respective rods, thereby to secure the rods to the securing flange.

10. A cargo pack as claimed in claim 9, wherein each channel of the securing flange, or of at least one of the securing flanges, has a respective slot along its length whereby the rod is insertable into the channel through the slot.

11. A cargo pack as claimed in claim 10, wherein the width of the slot is less than the transverse dimension of the rod whereby the rod is insertable into the channel with a snap action.

12. A cargo pack as claimed in claim 9, wherein the channels of the securing flange, or of at least one of the securing flanges is tubular whereby the rod is insertable into the channel by lengthwise sliding.

13. A cargo pack as claimed in claim 8, wherein a guide element is secured to the attachment wall between the mounting blocks.

14. A cargo pack as claimed in claim 13, wherein the guide element comprises a flexible material having passages through which the rods extend.

15. A cargo pack as claimed in claim 14, wherein the flexible material is welded to the material of the attachment wall.

16. A cargo pack as claimed in claim 1, wherein the opening is an elongate opening provided in one of the side walls.

17. A cargo pack as claimed in claim 16, wherein the pack is elongate and the rods and the opening extend in the lengthwise direction of the pack.

18. A cargo pack as claimed in claim 16, wherein an elongate reinforcing element is provided on the respective side wall adjacent the opening.

19. A cargo pack as claimed in claim 18, wherein the elongate reinforcing element is situated in an elongate pocket provided on the internal side of the respective side wall.

20. A cargo pack as claimed in claim 1, wherein a closure means is provided for closing the opening.

21. A method of assembling a cargo pack for attachment to a bicycle, the pack comprising an outer casing of a flexible material provided with an opening for loading the pack, the outer casing having oppositely disposed side walls and an attachment wall extending between the side walls and intended to lie adjacent a frame member of the bicycle, the attachment wall being provided with at least one mounting block having a surface for contact with the frame member and a securing flange secured to the material of the outer casing, the outer casing being provided with a stiffening structure for enhancing the rigidity of the attachment wall, the stiffening structure comprising a pair of rods which extend along the attachment wall adjacent the respective side walls, the rods engaging the securing flange to retain the rods with respect to the mounting block, wherein the outer casing is provided with an aperture for the passage of a flexible supply element, the method comprising inserting the rods through the aperture into engagement with the securing flange.

22. A method as claimed in claim 21 of assembling a cargo pack wherein the securing flange or at least one of the securing flanges extends within the pack and is provided with channels which receive the respective rods, thereby to secure the rods to the securing flange, in which method the rods are inserted through the aperture into the respective channels.

23. A method as claimed in claim 22 of assembling a cargo pack wherein each channel of the securing flange, or of at least one of the securing flanges, has a respective slot along its length whereby the rod is insertable into the channel through the slot, in which method the rods are positioned adjacent the respective channels and are displaced into the respective channel through the slot.

24. A method as claimed in claim 22 of assembling a cargo pack wherein the channels of the securing flange, or of at least one of the securing flanges, is tubular whereby the rod is insertable into the channel by lengthwise sliding, in which method the rods are inserted into one end of the respective channels and displaced into the respective channels by linear sliding.

25. A method as claimed in claim 22 of assembling a cargo pack wherein the guide element comprises a flexible material having passages through which the rods extend, in which method the rods are passed through the passages provided in the guide element.

* * * * *